(12) United States Patent
Yang et al.

(10) Patent No.: US 9,654,276 B2
(45) Date of Patent: *May 16, 2017

(54) WIRELESS LAN COMMUNICATION METHOD AND APPARATUS

(71) Applicant: SAMSUNG ELECTRONICS CO., LTD., Suwon-si (KR)

(72) Inventors: Chil-youl Yang, Suwon-si (KR); Chang-yeul Kwon, Suwon-si (KR); Jae-Hwa Kim, Suwon-si (KR); Dong-hwi Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,105

(22) Filed: Oct. 11, 2013

(65) Prior Publication Data

US 2014/0036899 A1    Feb. 6, 2014

Related U.S. Application Data

(63) Continuation of application No. 11/399,401, filed on Apr. 7, 2006, now Pat. No. 8,594,129, which is a (Continued)

(30) Foreign Application Priority Data

Sep. 6, 2004    (KR) .................. 10-2004-0070931

(51) Int. Cl.
*H04J 3/24*    (2006.01)
*H04L 5/02*    (2006.01)
(Continued)

(52) U.S. Cl.
CPC ............ *H04L 5/023* (2013.01); *H04L 1/1607* (2013.01); *H04L 1/188* (2013.01); *H04L 1/1829* (2013.01);
(Continued)

(58) Field of Classification Search
USPC ........................................................ 370/473
See application file for complete search history.

(56) References Cited

U.S. PATENT DOCUMENTS 6,181,754 B1    1/2001    Chen
6,735,256 B1    5/2004    Toshimitsu
(Continued)

FOREIGN PATENT DOCUMENTS

CN    1638384 A    7/2005
EP    1 351 414 A2    10/2003
(Continued)

OTHER PUBLICATIONS

Jan Boer, et al., Agere Systems, Backwards compatibility, "How to make a MIMO-OFDM system backswards compatible and coexistence with 11a/g at the link level", doc. IEEE 802.11-03/714r0, Sep. 2003, XP-002339064, Slide 1-26.
(Continued)

*Primary Examiner* — Olumide T Ajibade Akonai
*Assistant Examiner* — Randy Peaches
(74) *Attorney, Agent, or Firm* — Sughrue Mion, PLLC

(57) ABSTRACT

A wireless local area network (WLAN) communication method and apparatus are provided. The WLAN communication method includes allowing a receiving station to receive a multi input multi output (MIMO) frame, allowing the receiving station to determine whether the MIMO frame is erroneous and whether the MIMO frame is destined for the receiving station, allowing the receiving station to generate a single input single output (SISO) acknowledgement (ACK) frame if the MIMO frame is not erroneous and is destined for the receiving station, and allowing the receiving station to transmit the SISO ACK frame to a sending station that has transmitted the MIMO frame.

9 Claims, 10 Drawing Sheets

Related U.S. Application Data continuation of application No. 11/199,118, filed on Aug. 9, 2005, now abandoned.

(60) Provisional application No. 60/601,135, filed on Aug. 13, 2004.

(51) Int. Cl.

| | | |
|---|---|---|
| *H04L 1/18* | (2006.01) | |
| *H04B 7/02* | (2017.01) | |
| *H04L 1/16* | (2006.01) | |
| *H04L 27/26* | (2006.01) | |
| *H04L 1/12* | (2006.01) | |
| *H04W 84/12* | (2009.01) | |

(52) U.S. Cl.
CPC .................. *H04B 7/02* (2013.01); *H04L 1/16* (2013.01); *H04L 1/1671* (2013.01); *H04L 27/2602* (2013.01); *H04L 2001/125* (2013.01); *H04W 84/12* (2013.01)

(56) References Cited

U.S. PATENT DOCUMENTS

| | | |
|---|---|---|
| 6,977,944 B2 | 12/2005 | Brockmann et al. |
| 7,099,267 B2 | 8/2006 | Moon |
| 7,826,485 B2 | 11/2010 | Ho et al. |
| 2003/0072452 A1 | 4/2003 | Mody et al. |
| 2003/0169769 A1* | 9/2003 | Ho et al. ............... 370/473 |
| 2003/0185241 A1 | 10/2003 | Lu et al. |
| 2003/0231715 A1 | 12/2003 | Shoemake et al. |
| 2004/0082356 A1 | 4/2004 | Walton et al. |
| 2005/0078598 A1 | 4/2005 | Batra et al. |
| 2005/0136933 A1 | 6/2005 | Sandhu et al. |
| 2005/0160181 A1 | 7/2005 | Kwon et al. |
| 2005/0195733 A1 | 9/2005 | Walton et al. |
| 2005/0213576 A1* | 9/2005 | Stephens ............... 370/390 |
| 2005/0226142 A1 | 10/2005 | Moorti et al. |
| 2005/0288062 A1 | 12/2005 | Hammerschmidt et al. |
| 2006/0084461 A1 | 4/2006 | Sekiya et al. |
| 2006/0140172 A1 | 6/2006 | Trainin |
| 2007/0206519 A1 | 9/2007 | Hansen et al. |
| 2007/0263564 A1 | 11/2007 | Hansen et al. |

FOREIGN PATENT DOCUMENTS

| | | |
|---|---|---|
| EP | 1 553 730 A1 | 7/2005 |
| EP | 1 557 992 A2 | 7/2005 |
| JP | 11-220497 A | 8/1999 |
| JP | 2003/87856 A | 3/2003 |
| JP | 2005/198214 A | 7/2005 |
| JP | 2005/311920 A | 11/2005 |
| WO | 02/25853 A2 | 3/2002 |
| WO | 03/034644 A1 | 4/2003 |
| WO | 2004/051914 A1 | 6/2004 |
| WO | 2005/039105 A1 | 4/2005 |
| WO | 2005/112354 A1 | 11/2005 |
| WO | 2006/071679 A2 | 7/2006 |

OTHER PUBLICATIONS

Jianhua Liu, et al., "A MIMO System With Backward Compatibility for OFDM Based WLANS", 2003 4th IEEE Workshop on Signal Processing Advances in Wireless Communication, pp. 130-134.
Raqibul Mostafa, et al.. "Reduced Complexity MIMO Processing for WLAN (IEEE 802.11b) Applications", T2B.2, pp. 171-173.
Japanese Office Action in Japanese Application No. 2005-232328 dated Jan. 29, 2008.
First Office Action in the State Intellectual Property of P.R. China for Application No. 2005100899884 dated Mar. 16, 2007.

* cited by examiner

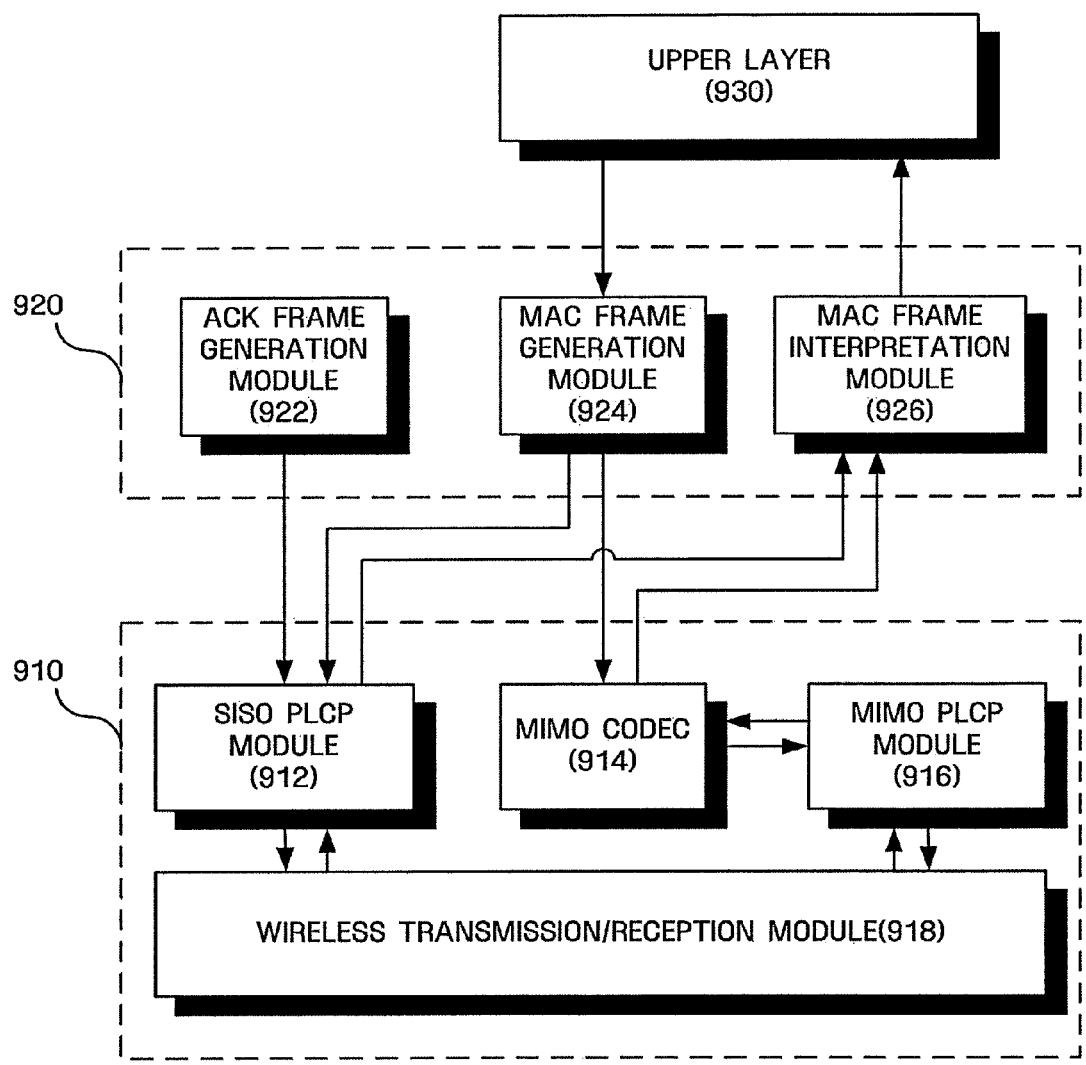

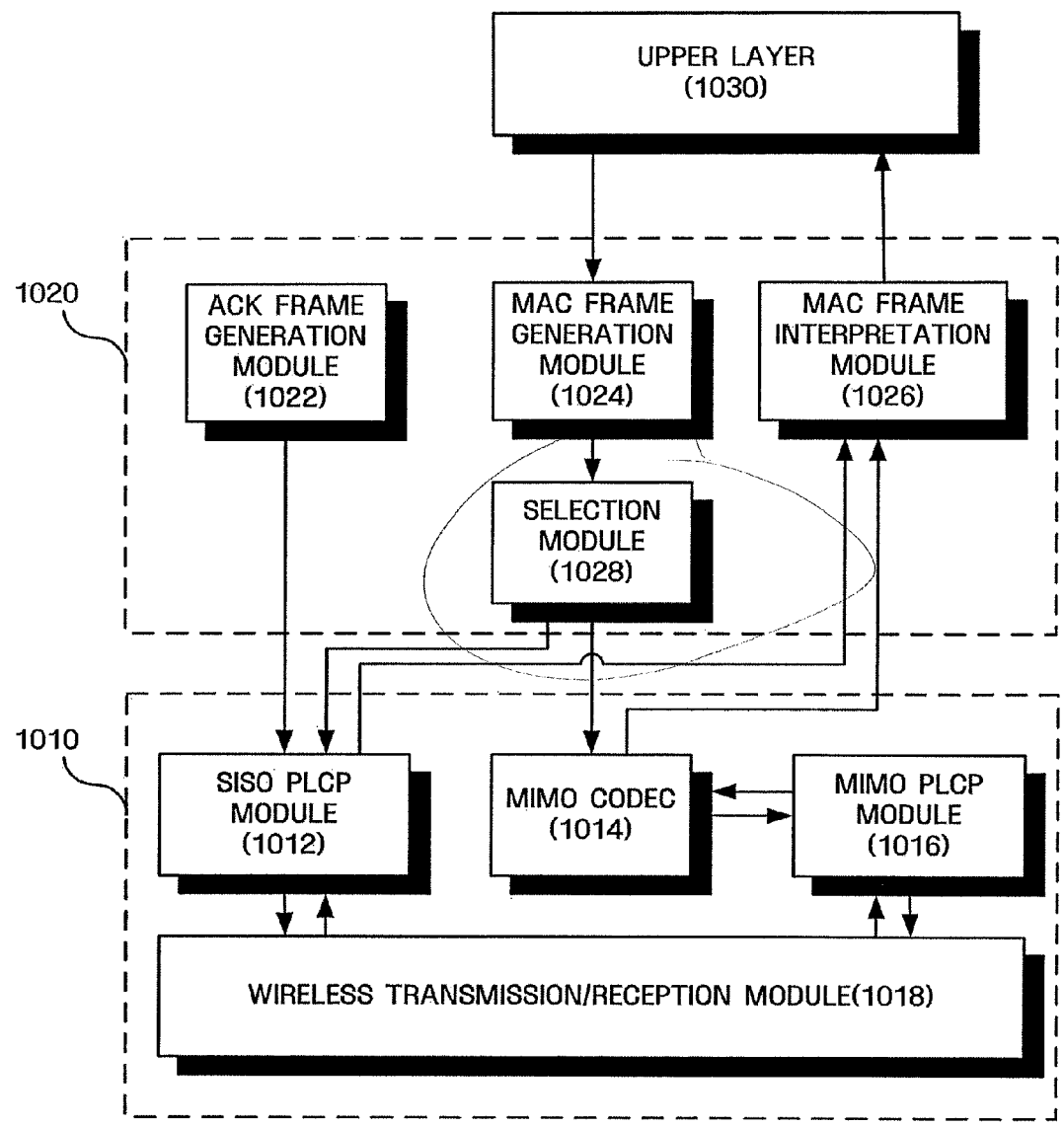

WIRELESS LAN COMMUNICATION METHOD AND APPARATUS

CROSS-REFERENCE TO RELATED APPLICATIONS

This is a continuation of application Ser. No. 11/399,401 filed Apr. 7, 2006, which is a continuation of application Ser. No. 11/199,118 filed Aug. 9, 2005. The entire disclosure of the prior applications, application Ser. No. 11/399,401 and application Ser. No. 11/199,118 is considered part of the disclosure of the accompanying continuation application and is hereby incorporated by reference.

This application claims priority from Korean Patent Application No. 10-2004-0070931 filed on Sep. 6, 2004 in the Korean Intellectual Property Office, and U.S. Provisional Patent Application No. 60/601,135 filed on Aug. 13, 2004 in the United States Patent and Trademark Office, the disclosures of which are incorporated herein by reference in their entirety.

BACKGROUND OF THE INVENTION

1. Field of the Invention

Apparatuses and methods consistent with the present invention relate to wireless local area network (LAN) communications, and more particularly, to wireless LAN (WLAN) communications using an improved carrier sensing mechanism.

2. Description of the Related Art

Recently, there is an increasing demand for ultra high-speed communication networks due to widespread public use of the Internet and a rapid increase in the amount of available multimedia data. Since LANs emerged in the late 1980s, the data transmission rate over the Internet has drastically increased from about 1 Mbps to about 100 Mbps. Thus, high-speed Ethernet transmission has gained popularity and wide spread use. Currently, intensive research into a gigabit speed Ethernet is under way. An increasing interest in the wireless network connection and communication has triggered research into and development of WLANs, greatly increasing availability of WLANs to consumers. Although use of WLANs may reduce performance in view of lower transmission rate and poorer stability as compared to wired LANs, WLANs have various advantages, including wireless networking capability, greater mobility and so on. Accordingly, WLAN markets have been gradually growing.

Due to the need for a greater transmission rate and the development of wireless transmission technology, the initial IEEE 802.11 standard, which specifies a 1 to 2 Mbps transfer rate, has evolved into advanced standards including 802.11b and 802.11a. Currently, a new IEEE standard, 802.11g, is being discussed by the Standardization Conference groups. The IEEE 802.11g standard, which delivers a 6 to 54 Mbps transmission rate in the 56 GHz-National Information Infrastructure (NII) band, uses orthogonal frequency division multiplexing (OFDM) as transmission technology. With an increasing public interest in OFDM transmission and use of a 5 GHz band, much greater attention is been paid to the OFDM than other wireless standards.

Recently, wireless Internet services using WLAN, so-called "Nespot," have been launched and offered by Korea Telecommunication (KT) Corporation of Korea. Nespot services allow access to the Internet using a WLAN according to IEEE 802.11b, commonly called Wi-Fi representing wireless fidelity. Communication standards for wireless data communication systems, which have been completed and promulgated or are being researched and discussed, include Wide Code Division Multiple Access (WCDMA), IEEE 802.11x, Bluetooth, IEEE 802.15.3, etc., which are known as 3rd Generation (3G) communication standards. The most widely known, cheapest wireless data communication standard is IEEE 802.11b, a series of IEEE 802.11x. An IEEE 802.11b WLAN standard delivers data transmission at a maximum rate of 11 Mbps and utilizes the 2.4 GHz-Industrial, Scientific, and Medical (ISM) band, which can be used at below a predetermined electric field without permission. With the recent widespread use of the IEEE 802.11a WLAN standard, which delivers a maximum data rate of 54 Mbps in the 5 GHz band by using OFDM, IEEE 802.11g developed as an extension to the IEEE 802.11a for data transmission in the 2.4 GHz band using OFDM is intensively being researched.

The Ethernet and the WLAN, which are currently being widely used, both utilize a carrier sensing multiple access (CSMA) method. According to the CSMA method, it is determined whether a channel is in use or not in use. If the channel is not in use, that is, if the channel is idle, then data is transmitted. If the channel is busy, retransmission of data is attempted after a predetermined period of time. A carrier sensing multiple access with collision detection (CSMA/CD) method, which is an improvement of the CSMA method, is used in a wired LAN, whereas a carrier sensing multiple access with collision avoidance (CSMA/CA) method is used in packet-based wireless data communications. In the CSMA/CD method, a station suspends transmitting signals if a collision is detected during transmission. Compared with the CSMA method, in which it is pre-checked whether a channel is occupied or not before transmitting data, in the CSMA/CD method, the station suspends transmission of signals when a collision is detected during the transmission of signals and transmits a jam signal to another station to inform it of the occurrence of the collision. After the transmission of the jam signal, the station has a random backoff period for delay and restarts transmitting signals. In the CSMA/CD method, the station does not transmit data immediately even after the channel becomes idle and has a random backoff period for a predetermined duration before transmission to avoid collision of signals. If a collision of signals occurs during transmission, the duration of the random backoff period is increased by two times, thereby further lowering a probability of collision.

As described above, conventionally, a single input single output (SISO) approach has been adopted for WLAN communications based on a CSMA/CA method. That is to say, a station (hereinafter referred to as an "SISO station") that adopts the SISO approach receives data from and transmits data to a wireless medium using a single antenna. However, in recent years, research on wireless communications based on a multiple input multiple output (MIMO) approach has been vigorously carried out. A station (hereinafter referred to as an "MIMO station") that adopts the MIMO approach, unlike an SISO station, transmits a plurality of data to a wireless medium via different transmission paths using a plurality of antennas and receives a plurality of data from another MIMO station via different transmission paths using the antennas. Accordingly, an MIMO station achieves higher data rates (data transferring rates) than an SISO station. However, in a WLAN where an MIMO station and an SISO station coexist, the SISO station may not be able to interpret any data transmitted by the MIMO station. Problems that may arise in such a WLAN will now be described in detail with reference to FIGS. 1 through 3.

FIG. 1 is a diagram illustrating the format of an IEEE 802.11a frame.

Referring to FIG. 1, the IEEE 802.11a frame is comprised of a physical layer convergence procedure (PLCP) preamble 110, a signal field 120, and a data field 130.

The PLCP preamble 110 indicates what data will be transmitted on a current physical layer. The signal field 120, which follows the PLCP preamble 110, includes one orthogonal frequency-division multiplexing (OFDM) symbol that is modulated at a lowest data rate using a basic modulation method. The data field 130 includes a plurality of OFDM symbols that are modulated at data rates higher than or equal to the data rate at which the OFDM symbol of the signal field 120 is modulated.

The signal field 120 is comprised of a total of 24 bits. In detail, the first through fourth bits of the signal field 120 constitute a rate field 142, which specifies how and at what coding rate the data field 130 has been modulated. The fifth bit of the signal field 120 is a reserved bit. The sixth through seventeenth bits of the signal field 120 constitute a length field 144, which specifies the length of the IEEE 802.11a frame.

The eighteenth bit of the signal field 120 is a bit used for parity check. The nineteenth through twenty fifth bits of the signal field 120 are tail bits. The length field 144 specifies the number of bytes constituting a media access control (MAC) frame contained in the data field 130. First through sixteenth bits of the data field 130 constitute a service field. The signal field 120 and the service field constitute a PLCP header 140. The data field 130 also includes a PLCP service data unit (PSDU), six tail bits, and pad bits. The PSDU corresponds to an MAC frame, which is comprised of an MAC header, an MAC data field, and a frame check sequence (FCS) used for determining whether the MAC frame is erroneous. The data field 130 may be modulated in various manners and at various coding rates. As described above, information regarding how and at what coding rate the data field 130 has been modulated is included in the rate field 142 of the signal field 120.

FIG. 2 is a diagram illustrating a carrier sensing operation performed in a WLAN.

Two carrier sensing methods, i.e., a physical carrier sensing method and a virtual carrier sensing method, are currently available for WLAN communications. The physical carrier sensing method and the virtual carrier sensing method will now be described in detail with reference to the accompanying drawings. Referring to FIG. 2, a frame 212, which is received by a physical layer 210, is comprised of a PLCP preamble 214, a signal field 216, and a data field 218.

The physical carrier sensing method enables a station to recognize whether signals are transmitted by a wireless medium. In other words, when the PLCP preamble 214 is input to the physical layer 210, the physical layer 210 notifies an MAC layer 220 that it is currently used by transmitting a busy signal to the MAC layer 220, as marked by 222. Thereafter, when the reception of the PLCP preamble 214 is completed, the physical layer 210 notifies the MAC layer 220 that it is idle by transmitting an idle signal 228 to the MAC layer 220.

A physical carrier sensing operation may be performed based on a result of interpreting a length field included in the signal field 216. The virtual carrier sensing method is a method that enables the MAC layer 220 to determine whether a wireless medium is used based on a result of interpreting a duration value, i.e., a network allocation vector (NAV) value, contained in an MAC frame included in the data field 218. Therefore, for a predetermined period of time specified by the duration value, the MAC layer 220 considers that the wireless medium is used. A station can receive the data field 218 and then read the NAV value from the MAC frame included in the received data field 218.

FIG. 3 is a diagram illustrating a conventional method of transmitting frames in a contention period in a WLAN where three MIMO stations, i.e., first through third MIMO stations, and an SISO station coexist.

According to the physical carrier sensing method, stations are prevented from transmitting frames via a wireless channel when frames are transmitted via the wireless channel by other stations. In a contention mode, stations cannot transmit a next frame immediately after the wireless channel becomes empty but are required to wait for a predetermined amount of time called a distributed inter-frame space (DIFS) and random back-off time to obtain the opportunity to transmit a frame via the wireless channel.

Referring to FIG. 3, the first MIMO station obtains the opportunity to transmit data through channel contention and thus transmits a data frame to the second MIMO station. Since the data frame transmitted by the first MIMO station is an MIMO frame, the third MIMO station as well as the second MIMO station can receive it, but the SISO station cannot receive it. Following a short inter-frame space (SIFS) after receiving the data frame transmitted by the first MIMO station, the second MIMO station transmits an acknowledgement (ACK) frame to the first MIMO frame.

Since the SIFS is shorter than the DIFS and the second MIMO station transmits the ACK frame following a short period of time after receiving the data frame transmitted by the first MIMO station, the second and third MIMO stations and the SISO station cannot transmit data until the transmission of the ACK frame is completed. Since the ACK frame is also an MIMO frame, the third MIMO station as well as the first MIMO station can receive it, but the SISO station cannot receive it.

The first through third MIMO stations can set their respective NAV values based on MIMO data that they receive by performing a virtual carrier sensing operation. Accordingly, the first through third MIMO stations can obtain the opportunity to transmit a next frame the DIFS and back-off time 310 after the transmission of the ACK frame is completed.

However, the SISO station cannot receive the MIMO data and thus cannot perform a virtual carrier sensing operation. In other words, while not receiving any data frame, the SISO frame considers that a collision between data frames has occurred. Therefore, the SISO station can obtain the opportunity to transmit a frame following an extended inter-frame space (EIFS) and back-off time 320 after performing a physical carrier sensing operation, and the EIFS is equal to the sum of the SIFS and a predetermined amount of time required for transmitting an ACK frame at a lowest data rate. In other words, the SISO station must wait a long period of time to obtain the opportunity to transmit a frame in an environment where it exists together with the first through third MIMO stations. Thus, the SISO station is in a disadvantageous position in channel contention with the first through third MIMO stations or other new MIMO stations. Therefore, it is necessary to develop a WLAN communication method that can prevent SISO stations from being discriminated against MIMO stations in an environment where they exist together with the MIMO stations.

SUMMARY OF THE INVENTION

The present invention provides a WLAN communication method and apparatus using an improved carrier sensing method.

According to an aspect of the present invention, there is provided a WLAN communication method including allowing a receiving station to receive a MIMO frame, allowing the receiving station to determine whether the MIMO frame is erroneous and whether the MIMO frame is destined for the receiving station, allowing the receiving station to generate SISO ACK frame if the MIMO frame is not erroneous and is destined for the receiving station, and allowing the receiving station to transmit the SISO ACK frame to a sending station that has transmitted the MIMO frame.

According to another aspect of the present invention, there is provided a WLAN communication method including allowing a sending station to generate an MIMO frame, allowing the sending station to transmit the MIMO frame to a receiving station, and allowing the sending station to receive an SISO ACK frame transmitted by the receiving station in response to the MIMO frame.

According to still another aspect of the present invention, there is provided a wireless LAN communication method including allowing a sending station to determine how an MAC frame is to be transmitted, allowing the sending station to generate an MIMO frame based on the MAC frame if the sending station decides to transmit the MAC frame in an MIMO approach, and allowing the sending station to generate an SISO frame based on the MAC frame if the sending station decides to transmit the MAC frame in an SISO approach, and allowing the sending station to transmit the generated MIMO or SISO frame in the selected approach.

According to a further aspect of the present invention, there is provided a station including a physical layer, which receives an MIMO frame transmitted via a wireless medium and obtains an MAC frame from the received MIMO frame, and an MAC layer, which determines whether the MAC frame is erroneous and whether the MAC frame is destined for the station, and generates an ACK frame and then provides the generated ACK frame to the physical layer if the MAC frame is not erroneous and is destined for the station, wherein the physical layer generates an SISO ACK frame based on the ACK frame provided by the MAC layer and provides the generated SISO ACK frame to the wireless medium.

According to a yet another aspect of the present invention, there is provided a station including an MAC layer, which generates an MAC frame and determines how the generated MAC frame is to be transmitted, and a physical layer, which generates an MIMO frame or an SISO frame based on the MAC frame based on the determination results and transmits the generated MIMO or SISO frame to a wireless medium.

BRIEF DESCRIPTION OF THE DRAWINGS

The above and other aspects of the present invention will become more apparent by describing in detail exemplary embodiments thereof with reference to the attached drawings in which:

FIG. 9 is a block diagram of an MIMO station according to an exemplary embodiment of the present invention; and FIG. 10 is a block diagram of an MIMO station according to another exemplary embodiment of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown. It is assumed in this disclosure that an MIMO station has two input ports and two output ports. However, the present invention is also applicable to an MIMO station having more than two input ports and more than two output ports and to an SIMO station having a single input port and multiple output ports and an MISO station having multiple input ports and a single output port.

Figure 4:
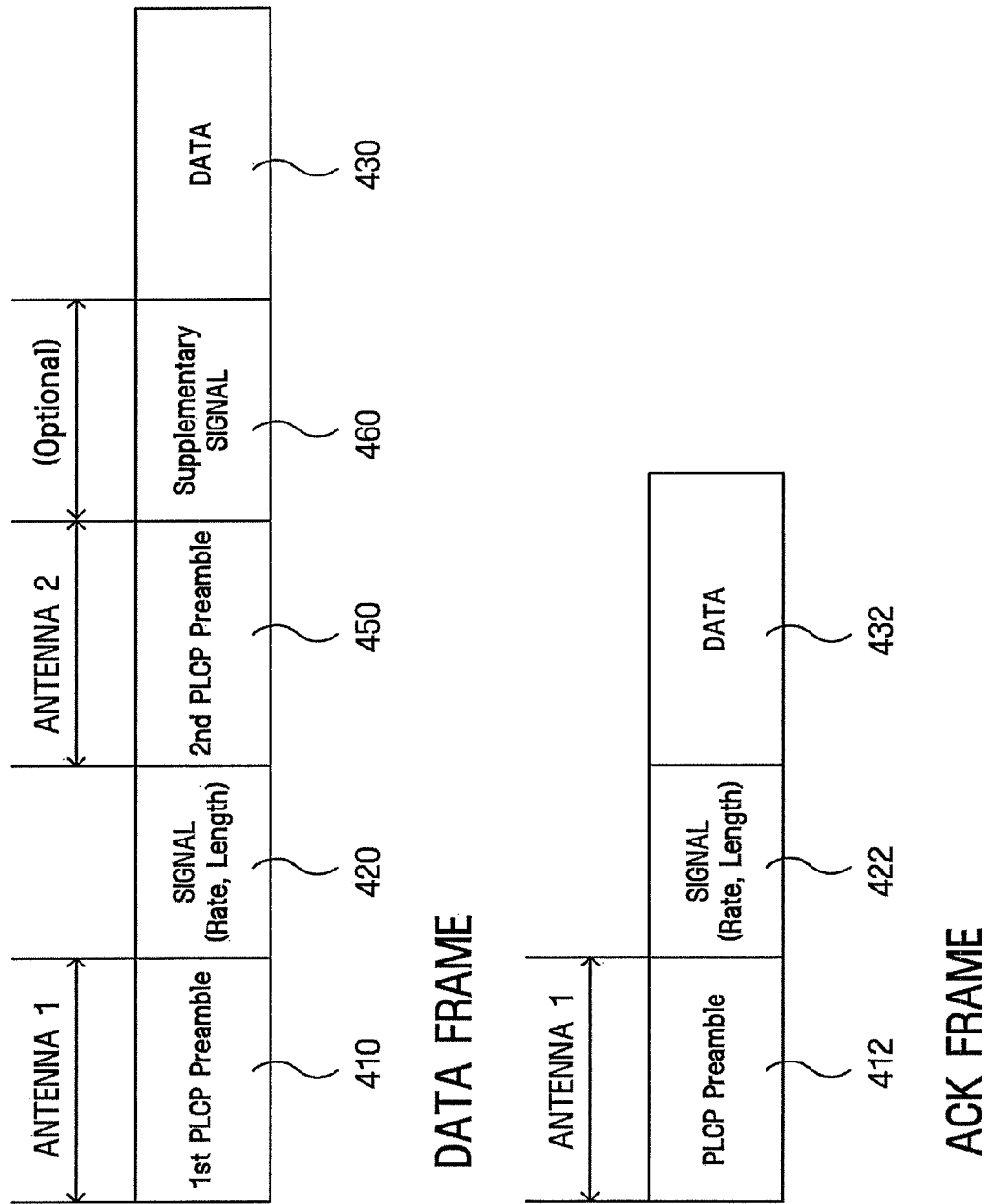
FIG. 4 is a diagram illustrating the formats of a data frame and an ACK frame according to an exemplary embodiment of the present invention.

FIG. 4 is a diagram illustrating the formats of a data frame and an ACK frame according to an exemplary embodiment of the present invention.

In the present exemplary embodiment, an MIMO data frame is used to facilitate a physical carrier sensing operation, and an SISO ACK frame is used to facilitate a virtual carrier sensing operation even when the MIMO data frame is received.

The structure of a data frame will now be described in detail with reference to FIG. 4.

Referring to FIG. 4, a data frame includes a first PLCP preamble 410, a signal field 420, a second PLCP preamble 450, and a data field 430. The data frame may optionally include a supplementary signal field 460. OFDM symbols received by antenna 1 of a receiving station and OFDM symbols received by antenna 2 of the receiving station coexist in the data field 430.

Figure 1:
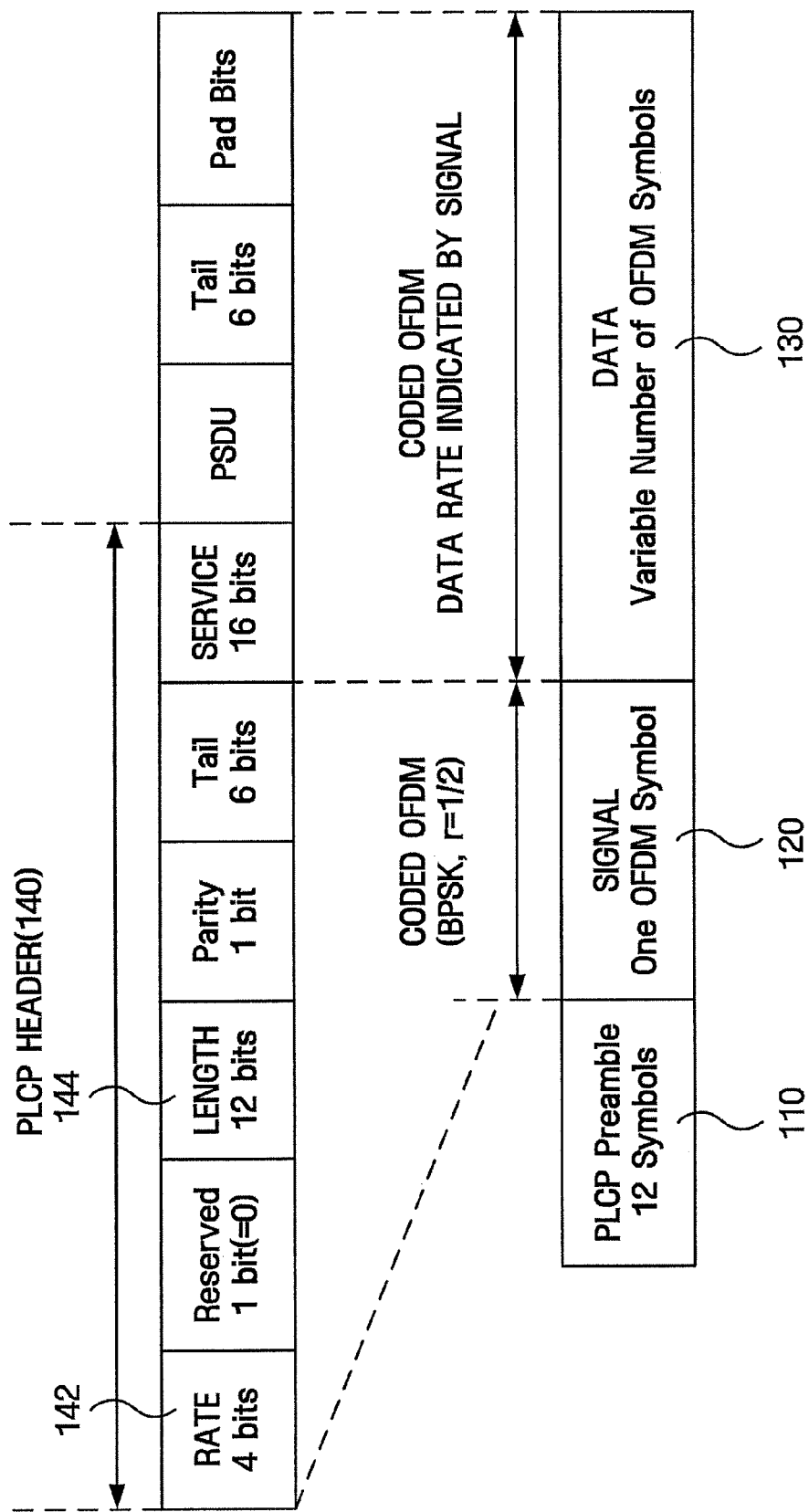
FIG. 1 is a diagram illustrating the format of an IEEE 802.11a frame.
Figure 2:
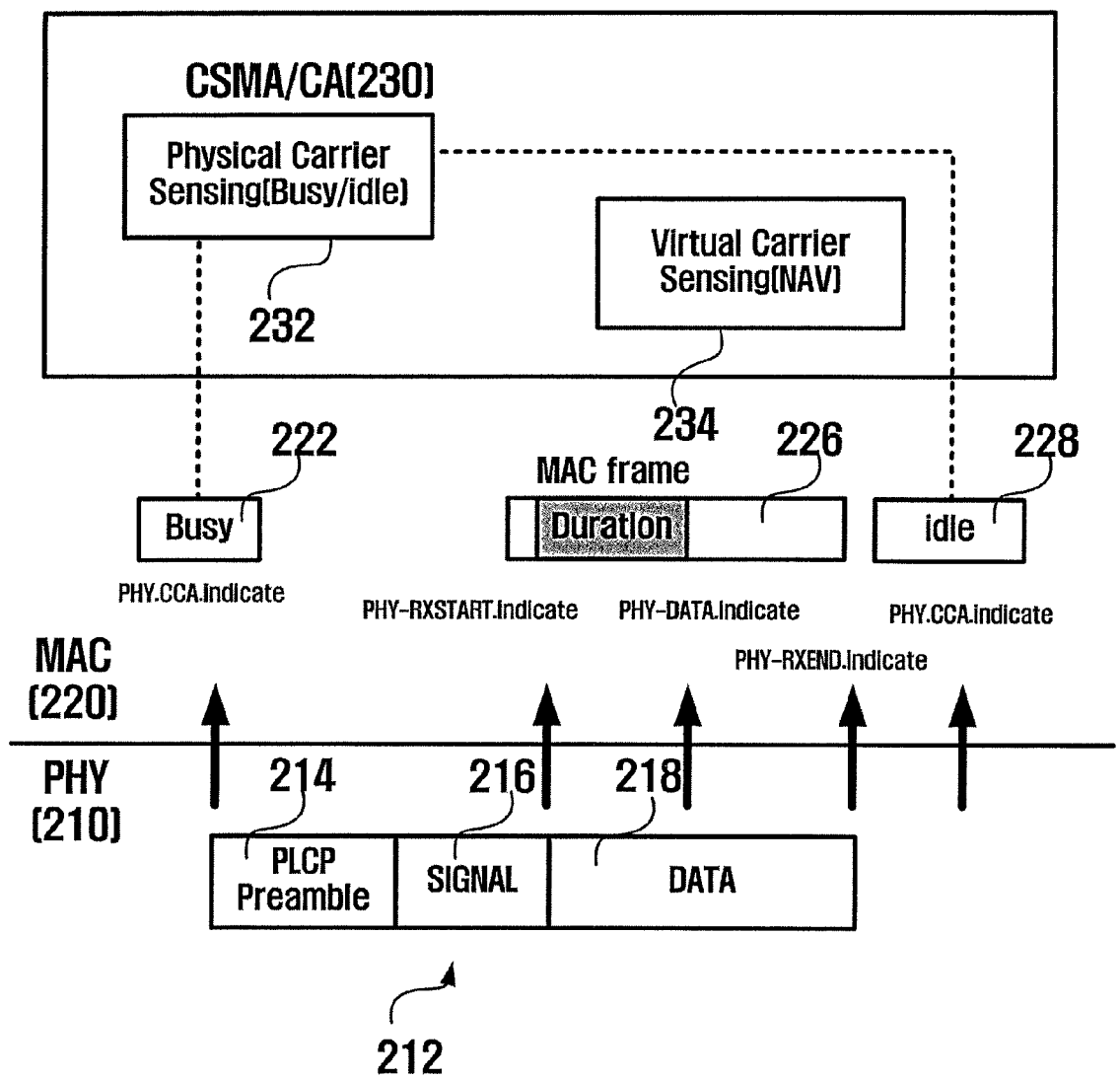
FIG. 2 is a diagram illustrating conventional carrier sensing methods for wireless communications.
Figure 3:
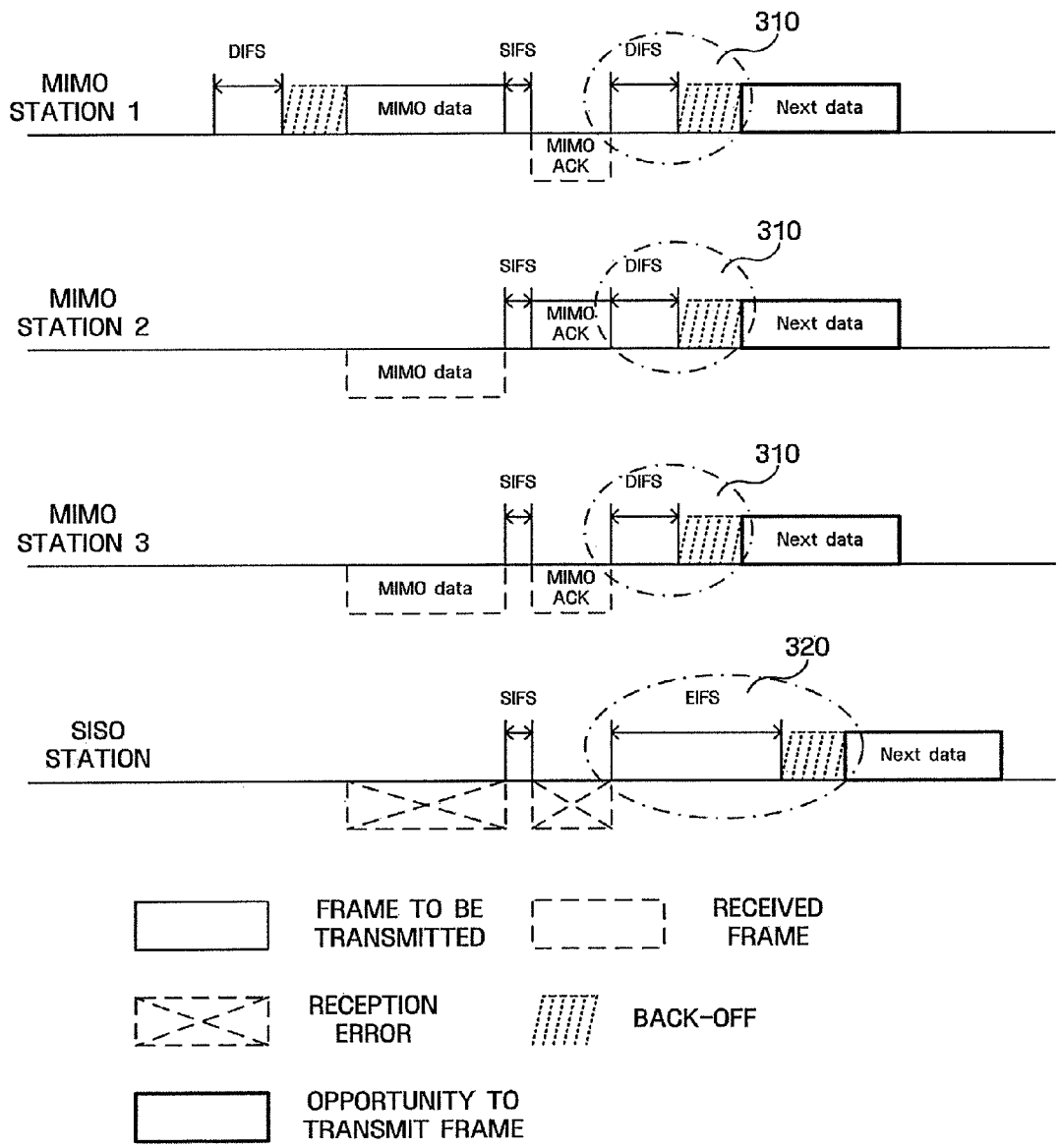
FIG. 3 is a diagram illustrating a conventional method of transmitting frames in a contention period in a conventional WLAN where MIMO stations and an SISO station coexist.

The first PLCP preamble 410 is a signal that antenna 1 is to synchronize itself with, and the second PLCP preamble 450 is a signal that antenna 2 is to synchronize itself with. In the present exemplary embodiment, the signal field 420 follows the first PLCP preamble 410. The first PLCP preamble 410 and the signal field 420 have the same structures as the first PLCP preamble 110 and the signal field 120, respectively, of FIG. 1. Thus, even an SISO station can obtain information contained in the signal field 420, for example, information regarding data rate information and frame length. The frame length indicates the length in bytes of part of the data frame following the signal field 420, i.e., the sum of the lengths in bytes of the second PLCP preamble 450, the supplementary signal field 460, and the data field 430. In other words, a station can obtain the duration of the fields following the signal field 460 by dividing the frame length by the data rate.

For example, if the data rate is 108 Mbps (54 Mbps per antenna), the duration of the second PLCP preamble 450 is 8 microseconds, the supplementary signal field 460 is 0 bytes, and the data field 430 contains n-byte data, then the frame length is calculated in the following manner. The duration of each OFDM symbol is four microseconds, and the second PLCP preamble 450 corresponds to two OFDM symbols. Since 216×2 byte-data per OFDM symbol can be transmitted at a data rate of 108 Mbps, it appears that the second PLCP preamble 450 has a length of 432 bytes. Therefore, n+432 is recorded as the frame length in a length field of the data frame.

If the data rate is 12 Mbps (6 Mbps per antenna), the duration of the second PLCP preamble 450 is 8 microseconds, the supplementary signal field 460 is comprised of 0 bytes, the data field 430 contains n-byte data, then the frame length is calculated in the following manner. As described above, the duration of each OFDM symbol is four microseconds, and the second PLCP preamble 450 corresponds to two OFDM symbols. Since 24×2 byte-data per OFDM symbol can be transmitted at a data rate of 108 Mbps, it appears that the second PLCP preamble 450 is has a length of 48 bytes. Therefore, n+48 is recorded as the frame length in a length field of the data frame.

In the present exemplary embodiment, an SISO frame still cannot receive an MIMO frame but can obtain information regarding the data rate and the length of the MIMO frame. Accordingly, an SISO station can perform a physical carrier sensing operation with reference to the frame length information as well as a power level. Therefore, according to the present invention, a station can more efficiently carry out a clear channel assessment (CCA) mechanism.

The structure of an ACK frame will now be described with reference to FIG. 4. The IEEE 802.11 standard prescribes that an ACK frame or a clear-to-send (CTS) frame must be transmitted at the same data rate as a frame that it follows as a response frame. Therefore, if a station receives an MIMO frame, it must transmit an MIMO ACK frame in response to the received MIMO frame, in which case, an SISO station cannot receive the MIMO ACK frame. Thus, in the present exemplary embodiment, a station is required to transmit an SISO ACK frame in response to a frame input thereto even though the input frame is an MIMO frame.

Referring to FIG. 4, an ACK frame includes a PLCP preamble 412 and a signal field 422. A block ACK frame based on the IEEE 802.11e standard may also include a data field 432.

The operation of a WLAN in a case where a station transmits an SISO ACK frame in response to a frame input thereto regardless of the type of the input frame will now be described in detail with reference to FIG. 5.

Figure 5:
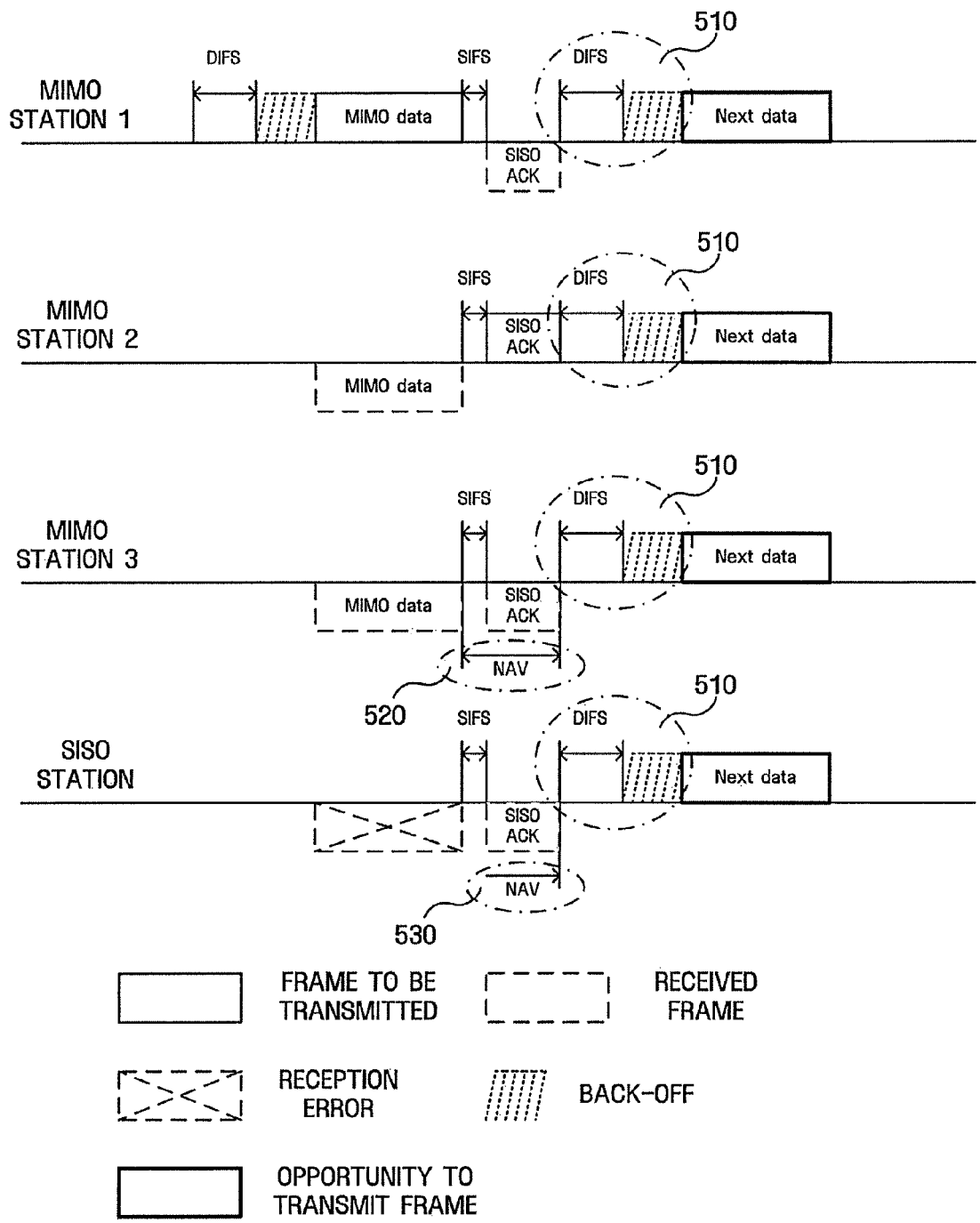
FIG. 5 is a diagram illustrating a method of transmitting frames in a contention period in a wireless LAN where MIMO stations and an SISO station coexist.

FIG. 5 illustrates a total of four stations, i.e., first through third MIMO stations (MIMO stations 1 through 3) and an SISO station (SISO station).

Referring to FIG. 5, the first MIMO station obtains the opportunity to transmit data through channel contention and thus transmits a data frame to the second MIMO station. Since the data frame transmitted by the first MIMO station is an MIMO frame, the third MIMO station can receive it, but the SISO station cannot receive it. However, in the present exemplary embodiment, unlike in the prior art, the SISO station can obtain information regarding data rate and frame length from a signal field of the data frame transmitted by the first MIMO station, and thus can efficiently perform a physical carrier sensing operation based on the information regarding data rate and frame length.

Following a short inter-frame space (SIFS) after receiving the data frame transmitted by the first MIMO station, the second MIMO station transmits an ACK frame to the first MIMO station in response to the received data frame. In the present exemplary embodiment, unlike in the prior art, the ACK frame transmitted by the second MIMO station is an SISO ACK frame. Thus, the SISO station as well as the first and third MIMO stations can receive the ACK frame transmitted by the second MIMO station. The third MIMO station obtains an MAC frame from the data frame transmitted by the first MIMO station and sets its NAV value 520 by performing a virtual carrier sensing operation. The SISO station obtains an MAC frame from the ACK frame transmitted by the second MIMO station and sets its NAV value 530 by performing a virtual carrier sensing operation.

Accordingly, following a DIFS and back-off time 510 after transmitting or receiving the ACK frame, the first through third MIMO stations and the SISO station may have the opportunity to transmit a frame.

The operations of a sending station and a receiving station and a carrier sensing operation will now be described in detail.

Figure 6:
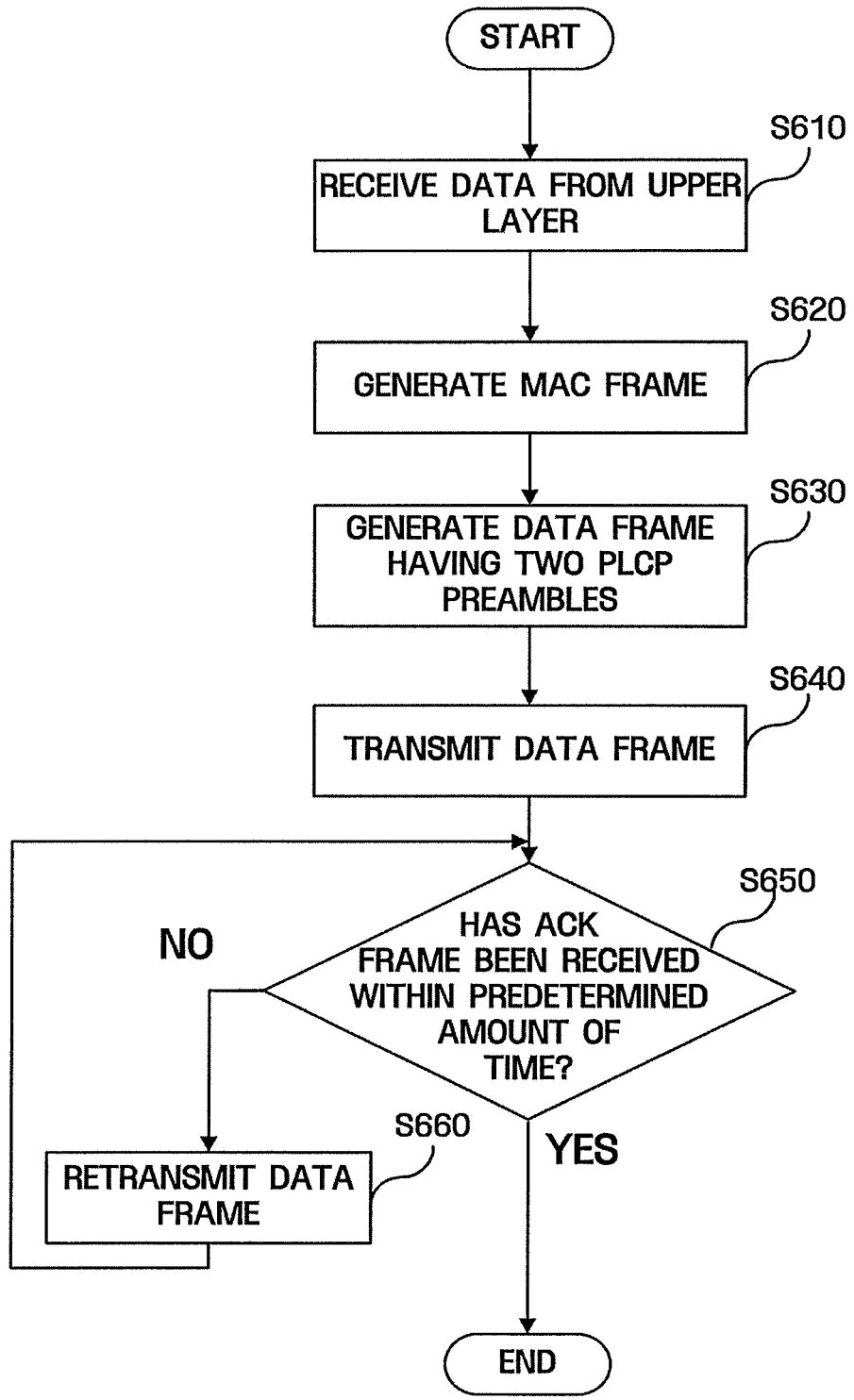
FIG. 6 is a flowchart illustrating the operation of a sending station according to an exemplary embodiment of the present invention.

FIG. 6 is a flowchart illustrating the operation of a sending station according to an exemplary embodiment of the present invention.

Referring to FIG. 6, in operation S610, an MAC layer of the sending station receives data from an upper layer. In operation S620, the MAC layer of the sending station generates an MAC frame by attaching an MAC header and a frame check sequence (FCS) to the received data.

In operation S630, a physical layer of the sending station receives the MAC frame and generates a data frame by attaching two PLCP preambles to the received MAC frame. In operation S640, the sending station transmits the data frame to a wireless medium.

In operation S650, the sending station determines whether it has received an ACK frame within a predetermined amount of time. If the sending station has received an ACK frame, the entire process of transmitting the data frame is completed. However, if the sending station has not received an ACK frame, it determines that the transmitting of the data frame in operation S640 was erroneous.

Therefore, in operation S660, the sending station doubles the size of a back-off contention window, contends with other stations, and retransmits the data frame to the wireless medium.

In operation S650, the sending station determines again whether it has received an ACK frame within the predetermined amount of time. If the sending station has received an ACK frame within the predetermined amount of time, the entire process of transmitting the data frame is completed.

Figure 7:
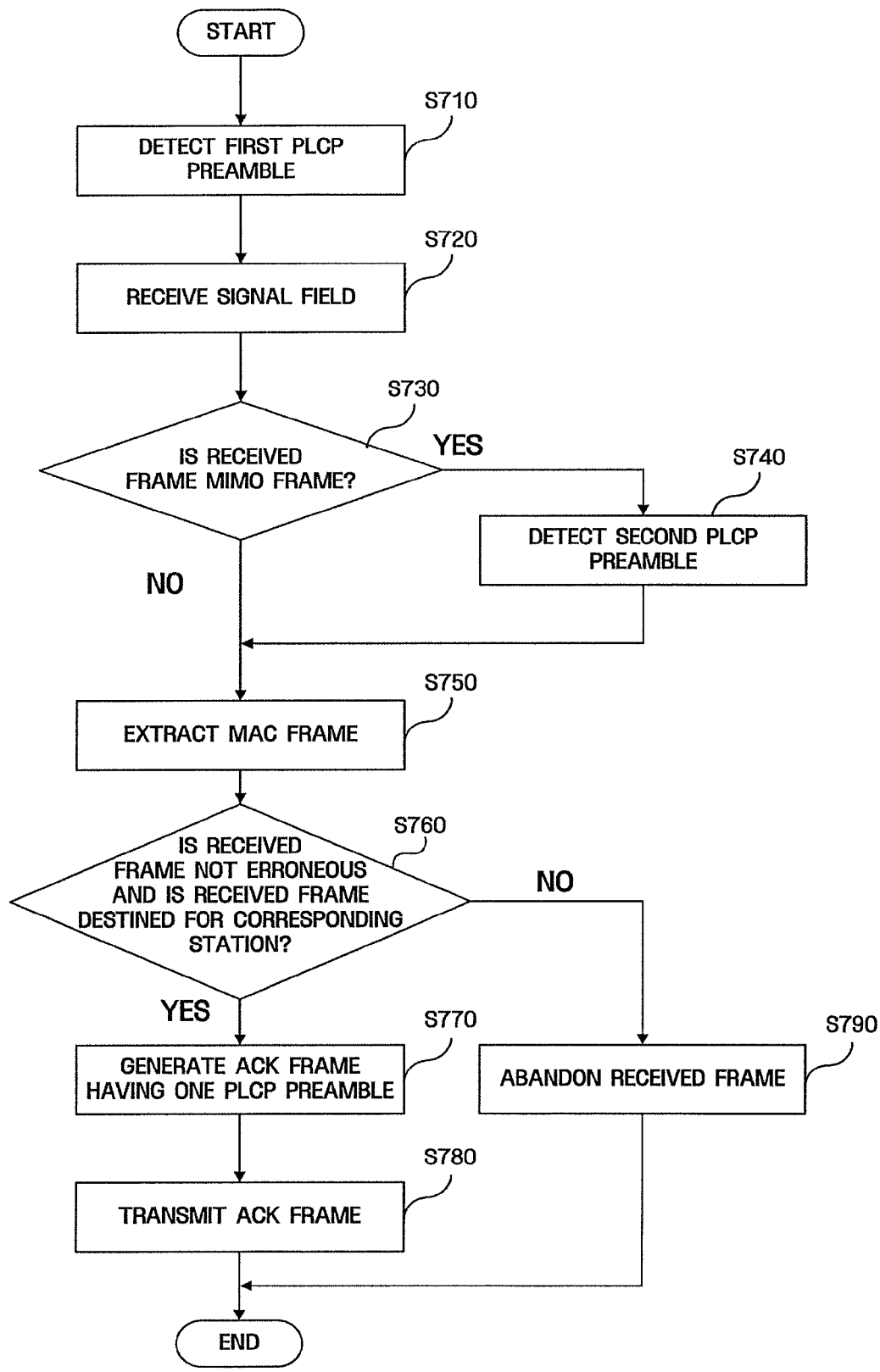
FIG. 7 is a flowchart illustrating the operation of a receiving station according to an exemplary embodiment of the present invention.

FIG. 7 is a flowchart illustrating the operation of a receiving station according to an exemplary embodiment of the present invention.

Referring to FIG. 7, in operation S710, the receiving station detects a first PLCP preamble and then recognizes that a data frame (hereinafter referred to as a "current data frame") is currently input thereto.

In operation S720, if a first antenna of the receiving station is synchronized with the detected first PLCP preamble, the receiving station receives a signal field which contains information regarding a data rate and a frame length.

In operation S730, the receiving station determines whether the current data frame is an MIMO frame. In operation S740, if the current data frame is an MIMO frame, the receiving station detects a second PLCP preamble, and then a second antenna of the receiving station is synchronized with the detected PLCP preamble. Otherwise, however, the detecting of the second PLCP preamble is skipped.

In operation S750, once the receiving station is synchronized with the current data frame using the first and/or second preambles, it extracts an MAC frame from a data field of the current data frame. In operation S760, the receiving station determines whether the current data frame is erroneous with reference to an FCS of the extracted MAC frame and whether the current data frame is destined for it with reference to an MAC header of the extracted MAC frame.

In operation S770, if the current data frame is not erroneous and is destined for the receiving station, the receiving station generates an ACK frame having one PLCP preamble in response to the current data frame. In operation S780, the receiving station transmits the ACK frame to a wireless medium.

However, if the current data frame is erroneous and is not destined for the receiving station, the receiving station abandons the current data frame in operation S790.

Figure 8:
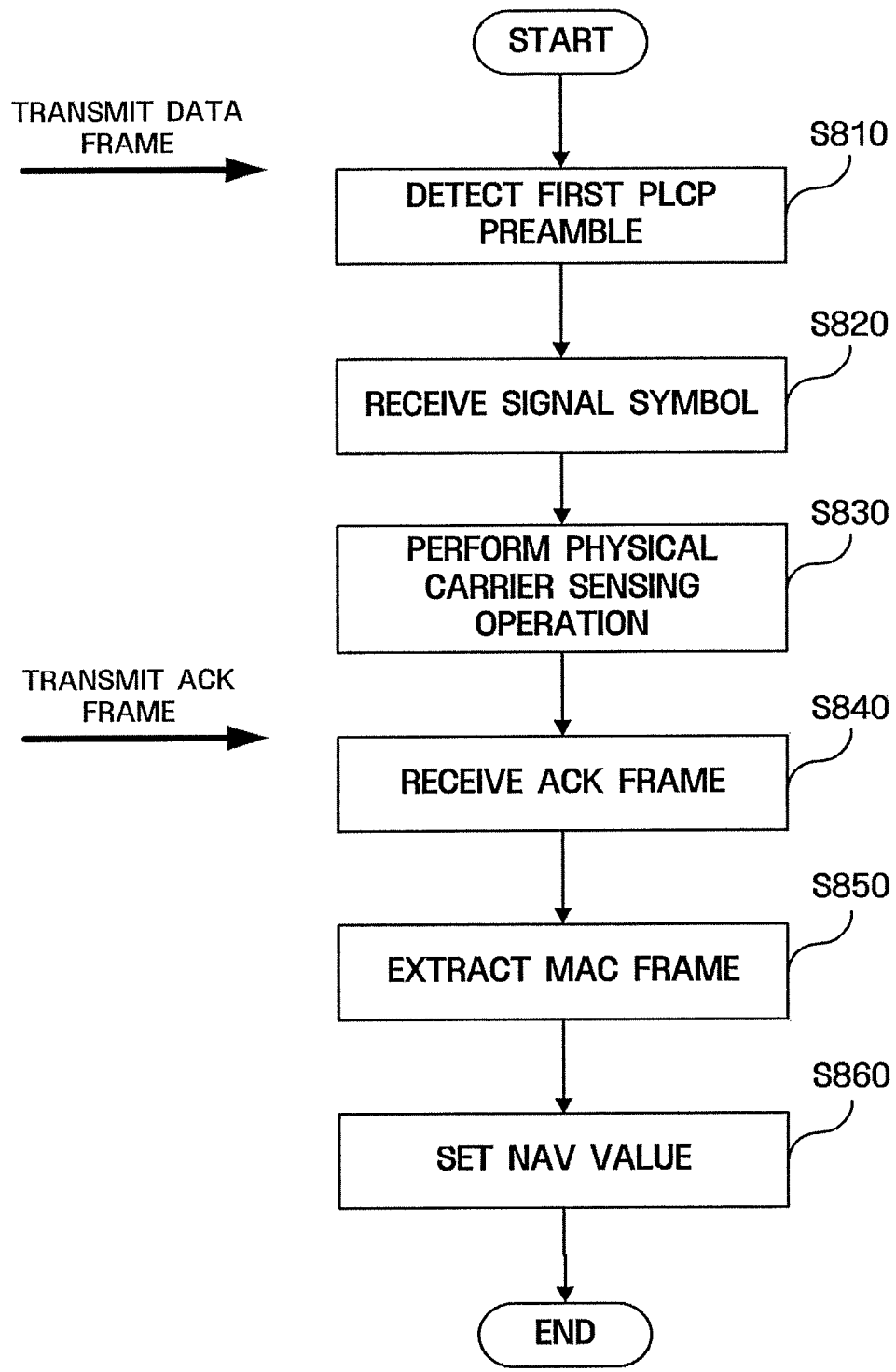
FIG. 8 is a flowchart illustrating a carrier sensing method performed by an SISO station according to an exemplary embodiment of the present invention.

FIG. 8 is a flowchart illustrating a carrier sensing operation performed by an SISO station according to an exemplary embodiment of the present invention.

Referring to FIG. 8, in operation S810, when a data frame is received via a wireless medium, an SISO station detects a first PLCP preamble. In operation S820, the SISO station receives a signal field. In operation S830, the SISO station obtains information regarding data rate and frame length by interpreting the received signal field and then performs a physical carrier sensing operation based on the obtained information. However, the SISO station cannot obtain an MAC frame yet and thus cannot set its NAV value yet by performing a virtual carrier sensing operation.

In operation S840, the SISO station receives an ACK frame. In the present exemplary embodiment, the ACK frame received by the SISO station is an SISO ACK frame, and thus, even the SISO station can receive it. Accordingly, in operation S850, the SISO station extracts an MAC frame from the received ACK frame. In operation S880, the SISO station obtains information necessary for setting its NAV value from a duration field of an MAC header and sets its NAV value based on the obtained information.

FIG. 9 is a block diagram of an MIMO station according to an exemplary embodiment of the present invention.

Referring to FIG. 9, the MIMO station includes a physical layer 910, an MAC layer 920, and an upper layer 930.

The physical layer 910 includes an SISO PLCP module 912, an MIMO PLCP module 916, an MIMO codec 914, and a wireless transmission/reception module 918.

In a process of transmitting a data frame, the SISO PLCP module 912, like a conventional SISO PLCP module, receives an MAC frame from the MAC layer 920 and generates an SISO frame by attaching a PLCP preamble and additional information to the received MAC frame. In a process of receiving a data frame, the SISO PLCP module 912 obtains an MAC frame by removing a PLCP header from an SISO frame received by the wireless transmission/reception module 918 and then transmits the obtained MAC frame to the MAC layer 920.

In the process of transmitting a data frame, the MIMO PLCP module 916 obtains MIMO data by coding an MAC frame with the use of the MIMO codec 914 and then generates an MIMO frame by attaching first and second PLCP preambles and additional information to the obtained MIMO data. In the process of receiving a data frame, the MIMO PLCP module 916 obtains MIMO data by removing a PLCP header from an MIMO frame received by the wireless transmission/reception module 918 and then provides the obtained MIMO data to the MIMO codec 914.

In the process of transmitting a data frame, the MIMO codec 914 obtains MIMO data by coding an MAC frame received from the MAC layer 920 and provides the obtained MIMO data to the MIMO PLCP module 916. In the process of receiving a data frame, the MIMO codec 914 receives MIMO data from the MIMO PLCP module 916 and provides the received MIMO data to the MAC layer 920.

In the process of transmitting a data frame, the wireless transmission/reception module 918 receives an SISO frame or an MIMO frame and transmits the received SISO or MIMO frame to a wireless medium (not shown). In the process of receiving a data frame, the wireless transmission/reception module 918 receives an SISO frame or an MIMO frame and transmits the received SISO or MIMO frame to the SISO PLCP module 912 or the MIMO PLCP module 916.

The MAC layer 920 includes an MAC frame generation module 924, an MAC frame interpretation module 926, and an ACK frame generation module 922.

In the process of transmitting a data frame, the MAC frame generation module 924 generates an MAC frame by attaching an MAC header and an FCS to data received from the upper layer 930 and transmits the generated MAC frame to the physical layer 910. In a case where the MIMO station transmits an MIMO frame, the MAC frame generated by the MAC frame generation module 924 is transmitted to the MIMO codec 914. On the other hand, in a case where the MIMO station transmits an SISO frame, the MAC frame generated by the MAC frame generation module 924 is transmitted to the SISO PLCP module 912.

In the process of receiving a data frame, the MAC frame interpretation module 926 receives an MAC frame from the physical layer 910 and determines whether the received MAC frame is erroneous with reference to an FCS of the received MAC frame. If the received MAC frame is erroneous, the MAC frame interpretation module 926 abandons the received MAC frame. However, if the received MAC frame is not erroneous, the MAC frame interpretation module 926 determines whether the received MAC frame is destined for the MIMO station with reference to a header of the received MAC frame. If the received MAC frame is destined for the MIMO station, the MAC frame interpretation module 926 transmits an MAC frame MSDU from which the MAC header and the FCS are removed to the upper layer 930. However, if the received MAC frame is not destined for the MIMO station, the MAC frame interpretation module 926 abandons the received MAC frame.

The ACK frame generation module 922 generates an ACK frame if the received MAC frame is not erroneous and is destined for the MIMO station. Thereafter, the ACK frame generation module 922 transmits the generated ACK frame to the SISO PLCP module 912.

FIG. 10 is a block diagram of an MIMO station according to another exemplary embodiment of the present invention.

Referring to FIG. 10, the MIMO station includes a physical layer 1010, an MAC layer 1020, and an upper layer 1030. The physical layer 1010 includes an SISO PLCP module 1012, an MIMO PLCP module 1016, an MIMO codec 1014, and a wireless transmission/reception module 1018. The operations of the SISO PLCP module 1012, the MIMO PLCP module 1016, the MIMO codec 1014, and the wireless transmission/reception module 1018 are the same as the operations of the SISO PLCP module 912, the MIMO PLCP module 916, the MIMO codec 914, and the wireless transmission/reception module 918 of FIG. 9.

The MAC layer 1020 includes an MAC frame generation module 1024, an MAC frame interpretation module 1026, an ACK frame generation module 1022, and a selection module 1028. The operations of the MAC frame generation module 1024, the MAC frame interpretation module 1026, and the ACK frame generation module 1022 are the same as the operations of the MAC frame generation module 924, the MAC frame interpretation module 926, and the ACK frame generation module 922 of FIG. 9.

The selection module 1028 decides whether an MAC frame generated by the MAC frame generation module 1024 is to be transmitted in an MIMO approach or in an SISO approach. If the MAC frame is long, the MIMO approach is more efficient than the SISO approach. On the other hand, if the MAC frame is short, the SISO approach is more efficient than the MIMO approach because the MIMO approach achieves two times higher data rates than the SISO approach but incurs more overhead, such as PLCP preambles, than the SISO approach. The selection module 1028 decides to transmit a frame to be broadcasted or multicasted, or a control frame or a management frame in the SISO approach because the frame to be broadcasted or multicasted must be received by a plurality of stations and the control frame or the management frame is generally more important than other frames.

If the selection module 1028 decides to transmit the MAC frame in the MIMO approach, it transmits the MAC frame to the MIMO codec 1014. On the other hand, if the selection module 1028 decides to transmit the MAC frame in the SISO approach, it transmits the MAC frame to the SISO PLCP module 1012.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed one or more computers in a communication system.

As described above, since the WLAN communication method and apparatus according to the present invention use an SISO ACK frame, SISO stations are not discriminated against MIMO stations in a WLAN where the SISO stations and the MIMO stations coexist. In addition, since a signal field is interposed between two PLCP preambles of an MIMO frame, even the SISO stations can obtain information necessary for performing a physical carrier sensing operation from the signal field of the MIMO frame.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A wireless local area network communication method comprising:
   determining that a media access control (MAC) frame is to be multicast;
   setting a single input single output (SISO) mode in order to transmit the MAC frame based on a determination that the MAC frame is to be multicast; and
   transmitting the MAC frame via a wireless medium.

2. The method of claim 1, wherein the setting comprises selecting the SISO mode if the MAC frame is to be multicast and the MAC frame is a management frame.

3. The method of claim 1, wherein the setting operation always selects the SISO mode when it is determined that the MAC frame is to be multicast.

4. A station comprising:
   a media access control (MAC) layer which generates a MAC frame, determines a media access control (MAC) frame is to be multicast and sets a single input single output (SISO) mode as a transmitting mode of the MAC frame based on a determination that the MAC frame is to be multicasted; and
   a physical layer which transmit the MAC frame via a wireless medium.

5. The station of claim 4, wherein the MAC layer selects the SISO mode as the transmitting mode of the MAC frame if the MAC frame is to be multicast and the MAC frame is a management frame.

6. The station of claim 4, the media access control (MAC) layer always selects the SISO mode when it is determined that the MAC frame is to be multicast.

7. A non-transitory recording medium on which a computer program to execute a wireless local area network communication method, the method comprising:
   determining that a media access control (MAC) frame is to be multicast;
   setting a single input single output (SISO) mode in order to transmit the MAC frame based on a determination that the MAC frame is to be multicast;
   and
   transmitting the MAC frame via a wireless medium.

8. The non-transitory recording medium of claim 7, wherein the setting comprises selecting the SISO mode, if the MAC frame is to be multicast and MAC frame is a management frame.

9. The non-transitory recording medium of claim 7, wherein the setting operation always selects the SISO mode when it is determined that the MAC frame is to be multicast.

* * * * *